United States Patent
Soffer et al.

(10) Patent No.: US 9,026,647 B2
(45) Date of Patent: May 5, 2015

(54) SYSTEMS AND METHODS FOR A SOCIAL MEDIA NETWORK/BUSINESS PLATFORM INTERFACE

(75) Inventors: Guy Soffer, Ra'anana (IL); Keren Rotenberg, Hod-Hasharon (IL)

(73) Assignee: SAP SE, Walldorf (DE)

( * ) Notice: Subject to any disclaimer, the term of this patent is extended or adjusted under 35 U.S.C. 154(b) by 496 days.

(21) Appl. No.: 13/333,102

(22) Filed: Dec. 21, 2011

(65) Prior Publication Data

US 2013/0166721 A1      Jun. 27, 2013

(51) Int. Cl.
  *G06Q 50/00* (2012.01)
  *H04L 12/58* (2006.01)

(52) U.S. Cl.
  CPC .............. *G06Q 50/01* (2013.01); *H04L 51/32* (2013.01)

(58) Field of Classification Search
  None
  See application file for complete search history.

(56) References Cited

U.S. PATENT DOCUMENTS

| | | | |
|---|---|---|---|
| 7,165,113 B2 * | 1/2007 | Karp et al. | 709/230 |
| 2002/0120704 A1 * | 8/2002 | Karp et al. | 709/207 |
| 2006/0080352 A1 * | 4/2006 | Boubez et al. | 707/102 |
| 2010/0242120 A1 * | 9/2010 | Anderson et al. | 726/27 |
| 2012/0233258 A1 * | 9/2012 | Vijayaraghavan et al. | 709/204 |
| 2013/0086163 A1 * | 4/2013 | Neff | 709/204 |
| 2013/0205215 A1 * | 8/2013 | Dunn et al. | 715/738 |

* cited by examiner

*Primary Examiner* — Brian P Whipple
(74) *Attorney, Agent, or Firm* — Buckley, Maschoff & Talwalkar LLC (57) ABSTRACT

According to some embodiments, information associated with a task may be received, including a trigger entity and a related action entity. A social media network/business platform interface may monitor a trigger condition associated with the trigger entity. The social media network/business platform interface may then automatically detect that the trigger condition is satisfied. Responsive to that detection, an action defined by the action entity related to the trigger entity may be automatically performed.

20 Claims, 8 Drawing Sheets

| TASK IDENTIFIER 802 | TRIGGER ENTITY 804 | ACTION ENTITY 806 | STATUS 808 | TASK RESULT 810 |
|---|---|---|---|---|
| T101 | COMPLAINT POSTED ON FACEBOOK | OPEN WORK ITEM AT GW | MONITORING | NONE |
| T102 | PRODUCT MENTION ON TWITTER | GENERATE EMAIL FROM GW | TRIGGERED 15 JAN 2015 11:45 AM | PRODUCT ID, USER WHO MENTIONED PRODUCT |
| T103 | NEW ADVERTISING CAMPAIGN LAUNCHED AT GW | CREATE FACEBOOK POST | TRIGGERED 20 JAN 2015 12:22 PM | NONE |
| T104 | PRODUCT LIKE ON FACEBOOK | CREATE CONTACT AT GW | TRIGGERED 21 JAN 2015 3:01 PM | PRODUCT ID, NAME, DATE |

*FIG. 8*

SYSTEMS AND METHODS FOR A SOCIAL MEDIA NETWORK/BUSINESS PLATFORM INTERFACE

FIELD

Some embodiments relate to social media networks and business platforms. More specifically, some embodiments relate to systems and methods that may facilitate an interface between a social media network and business platform.

BACKGROUND

Many people exchange information using social media networks, such as by posting text messages, pictures, and/or videos on Facebook, twitter, and the like. In some cases, people use social media networks to share information relevant to a business enterprise. For example, a person might provide feedback or comments about a product or server he or she has used, suggest ideas for a new product, or complain about some aspect of a business enterprise.

A business enterprise may therefore be interested in making use of this type of information For example, company might want to monitor and leverage the unstructured information available on social media networks by converting the information to structured business data, consolidating it in one or more backend business platforms, and executing business actions according to a defined task. Similarly, a business might want to automatically distribute information using social media networks (e.g., based on data stored at a business platform). Note, however, that there are many different types of social media networks and business platforms. In addition, these systems are usually disconnected and represent different types of data (e.g., structured versus unstructured).

Accordingly, an efficient mechanism for providing an interface between social media networks and business platforms may be addressed by some embodiments herein.

DETAILED DESCRIPTION

Figure 1:
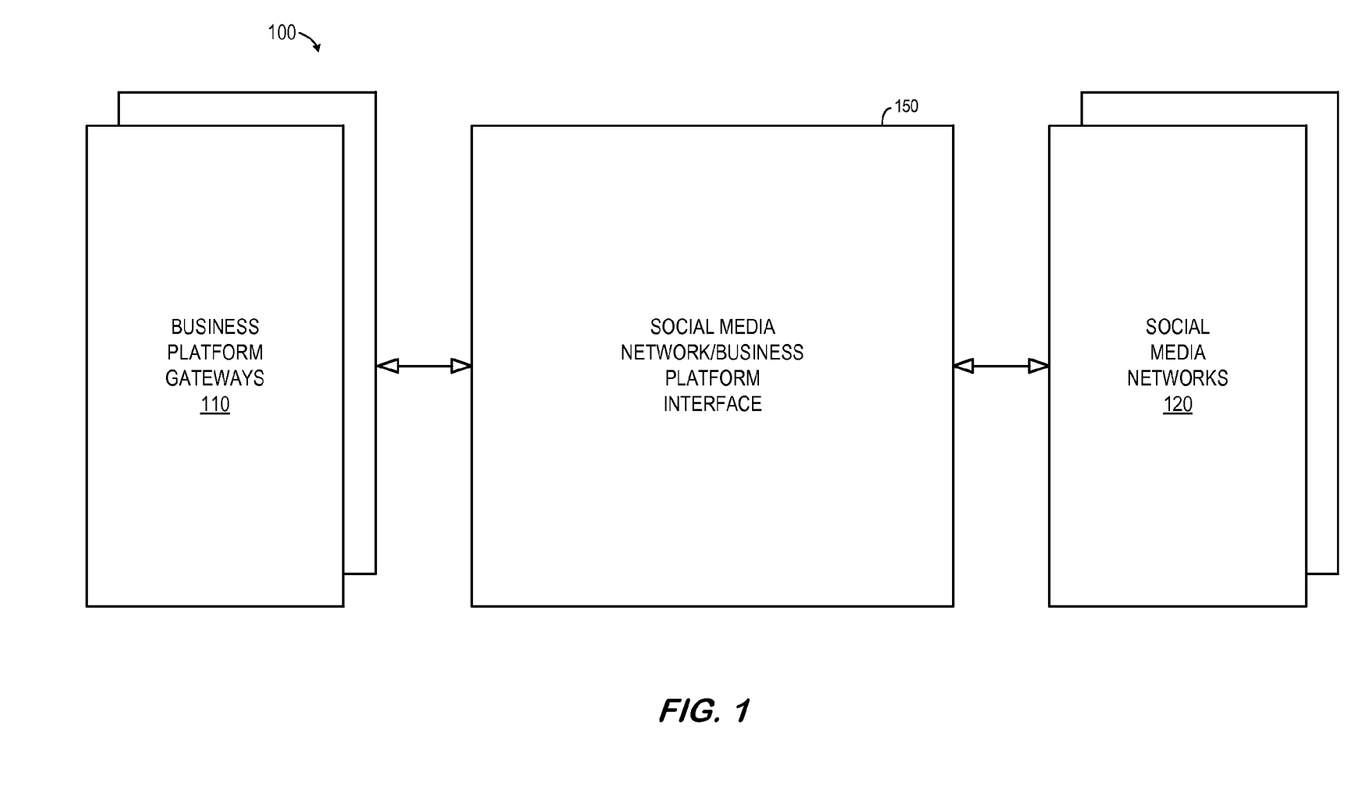
FIG. 1 is a block diagram of a system suitable for supporting various aspects of the present disclosure.

FIG. 1 is a block diagram of a system 100 suitable for supporting various aspects of the present disclosure. In particular, the system 100 includes one or more business platform gateways 110 that may store and execute business data associated with an enterprise. The system 100 further includes one or more social media networks 120 and a social media network/business platform interface 150 that may facilitate an exchange of information and/or actions between the business platform gateways 110 and social media networks 120 in accordance with any of the embodiments described herein. For exemplary purposes, such social media networks 120 might include ebay.com, Facebook.com, LinkedIn.com, AngiesList.com, Twitter.com, Blogger.com, MySpace.com, Friendster.com, Google +1, and other similar sites. Any of the devices included in the system 100 might comprise, for example, servers, database farms, Personal Computers (PCs), etc. Moreover, any of the devices described herein may be remotely located and/or exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

According to some embodiments, an efficient mechanism for exchanging information and/or actions between the business platform gateway 110 and social media networks 120 may be provided. Consider, for example, FIG. 2 which illustrates a method 200 that might be performed, for example, by some or all of the elements of the system 100 described with respect to FIG. 1 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

Figure 2:
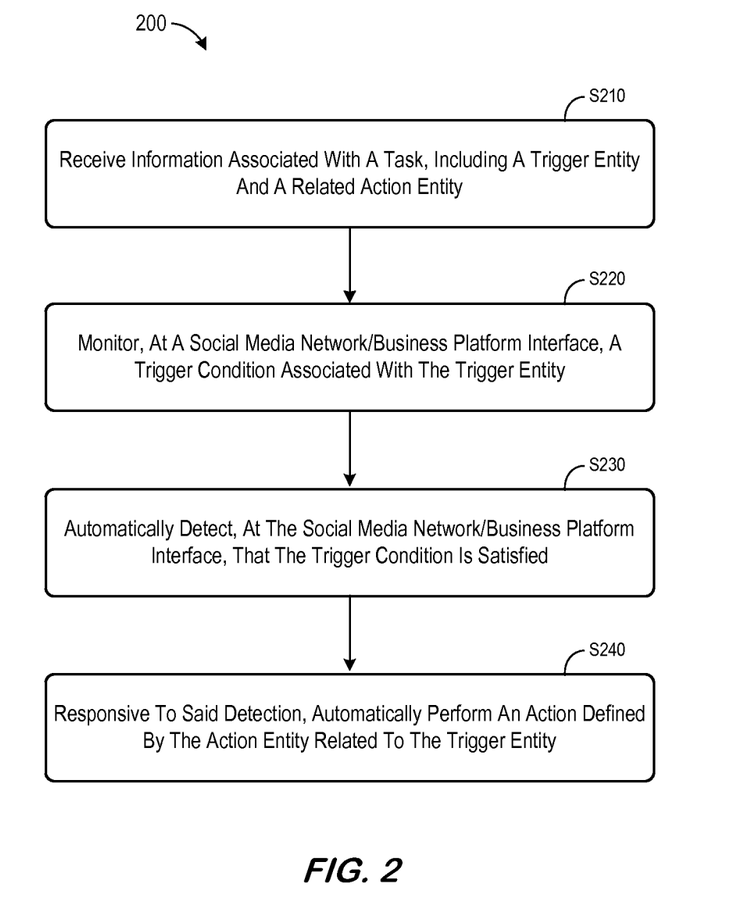
FIG. 2 is a flow diagram illustrating various aspects of the present disclosure, in accordance with some embodiments.

At S210, information associated with a task may be received, and the received information may include a trigger entity and a related action entity. The trigger entity may be, for example, associated with a social media network. By ways of examples, the trigger entity might be associated with: (i) a post, (ii) a link, (iii) a like indication, (iv) a group join, (v) a social media event, (vi) a comment, (vii) a rating, (viii) a review, (ix) a status, (x) a picture, (xi) audio information, and/or (xii) video information. According to some embodiments, the trigger entity might be associated with a text search, including a keyword search, natural language processing, and/or a speech-to-text conversion process. The information may be received, for example, from a designer at design time or from a database at run time.

At S220, a social media network/business platform interface may monitor a trigger condition associated with the trigger entity. For example, the social media network/business platform interface might monitor Facebook looking for posts that mention a particular company or product. At S230, the social media network/business platform interface may "automatically" detect that the trigger condition is satisfied. As used herein, the term "automated" may refer to an action that may be performed with little or no human intervention. For example, the social media network/business platform interface might automatically detect that a person has entered a message on twitter that includes a particular keyword or phrase. According to some embodiments, a social media network/business platform interface may provide the ability to have an operator manually control execution of an action through a user interface (e.g., he or she might be asked for approval before an automatically suggested action is taken by the platform).

At S240, one or more actions defined by the action entity related to the trigger entity may be automatically performed responsive to the detection that occurred at S230. According to some embodiments, the action entity may be associated with a business platform. For example, the action entity might be associated with the business platform sending an email, creating a contact entity, creating a business object, updating an existing entity, and/or a business work item. Consider, for example, a social media network/business platform interface that detects a person "liking" a particular product on his or her Facebook page. In this case, the social media network/business platform interface might automatically arrange for a new contact or lead entity to be created within the business platform based on that persons email address, name, etc.

Thus, activities on social media networks may automatically result in actions be executed in connection with a business platform. Note, however, that the reverse flow of events may also be performed in accordance with any of the embodiments described herein. For example, a trigger entity may be associated with a business platform while the associated action entity is associated with a social media network. Consider, for example, a social media network/business platform interface that detects that a new product is being introduced or a new milestone has been reached based on information available within a business platform. As a result of this trigger, the social media network/business platform interface might arrange to automatically update a social media network page or post.

According to some embodiments, task triggers and actions may be configured by a user via a Graphical User Interface (GUI) at design time. The GUI may provide, for example, a relatively quick and easy way for a business to define a particular integration between social media networks and the business's own platform or gateway. According to some embodiments, a GUI design tool may be used define the gateway/social media network tasks and a run time component may execute the tasks defined in the design tool.

Figure 3:
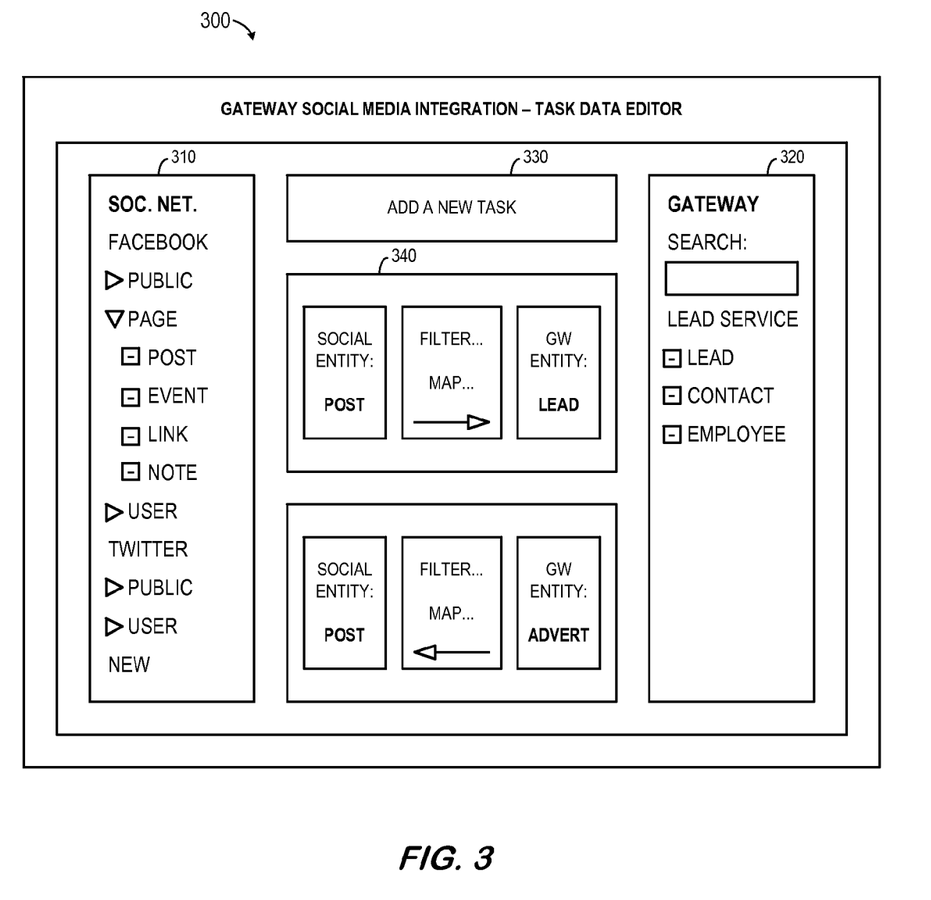
FIG. 3 illustrates a task data editor display in accordance with some embodiments.

For example, FIG. 3 illustrates a task data editor display 300 in accordance with some embodiments. The display 300 includes a social network area 310 that can be used to select one or more networks (e.g., Facebook and twitter) as well as one or more elements associated with each network (e.g., Facebook public posts and links). The display 300 also includes a gateway area 320 that can be used to select one or more business platforms and elements associated with each platform (e.g., a lead service contact). According to some embodiments, a search function may be provided in the social network area 310 and/or gateway area 320 to help a designer find appropriate elements.

An "add new task" icon 330 may be selected by a design to create a new task which will then appear as displayed task 340. The displayed task 340 may include a social entity (e.g., Facebook post), an associated gateway entity, and an arrow indicating which way the displayed task 340 is to operate (e.g., either a social network trigger may result in a gateway action or a gateway trigger may result in a social network trigger). Moreover, one icon within the displayed task 340 may be selected to define filtering information and another icon may be selected to define mapping information for the displayed task 340.

Figure 4:
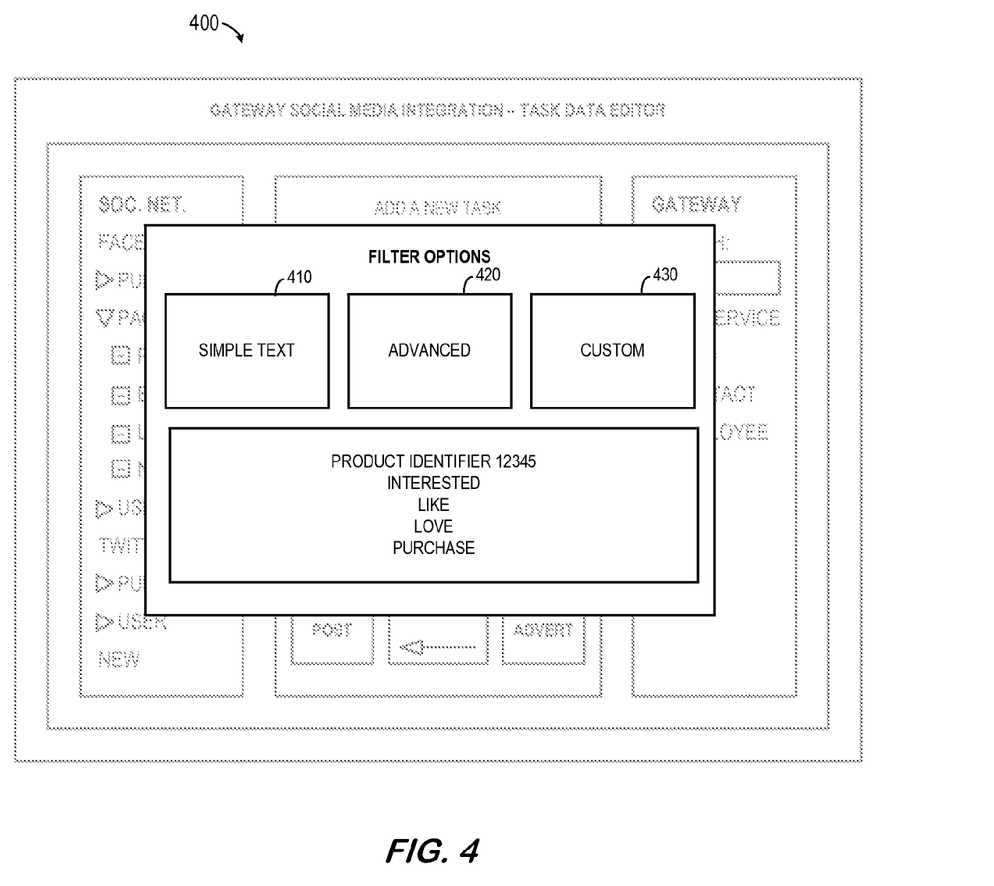
FIG. 4 illustrates a filter options pop-up display in accordance with some embodiments.

For example, selecting the filtering icon within the displayed task 340 of the task data editor display 300 of FIG. 3 may result in the appearance of a filter options pop-up display 400 as illustrated in FIG. 4 according to some embodiments. The filter options display 400 may be used by a designer to define one or more filtering criteria for a task. For example, selection of a simple text icon 410 may cause the task to look for the appearance of a keyword (e.g., "like" or "love") on a social media network. Selection of an advanced icon 420 might be used to define more complicated filters, such as those associated with natural language processing, speech-to-text conversion, and/or an optical character recognition process. Similarly, selection of a custom icon 430 might let a designer define a customized filter.

Figure 5:
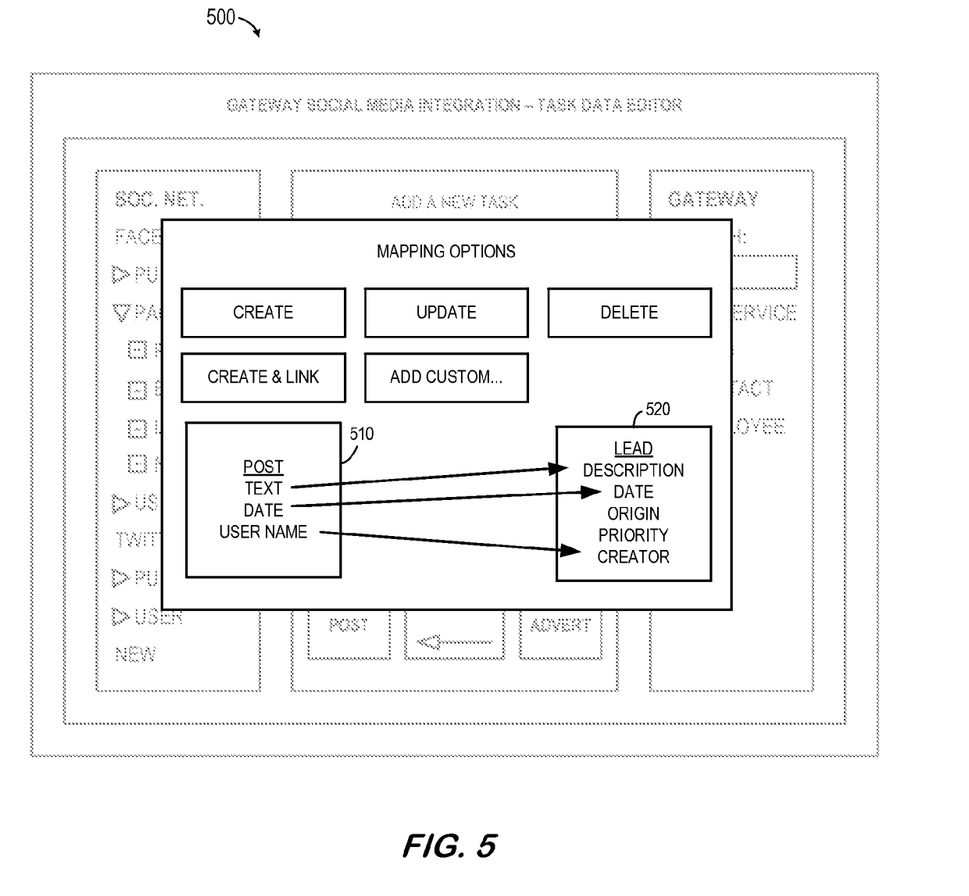
FIG. 5 illustrates a mapping options pop-up display in accordance with some embodiments.

Selecting the mapping icon within the displayed task 340 of the task data editor display 300 of FIG. 3 may result in the appearance of a mapping options pop-up display 500 as illustrated in FIG. 5 according to some embodiments. The mapping options display 500 may be used by a designer to define property mappings between a social media entity and a gateway entity. For example, elements of a trigger entity 510 might be mapped to associated elements of an action entity 520 (e.g., a social media network "user name" might be used to populate a "creator" field in a gateway lead application). Moreover, the mapping options display 500 may include icons that may be selected by a designer to create a mapping, update an existing mapping, delete a mapping, create and automatically link a mapping, and/or define customized mapping for a task.

Figure 6:
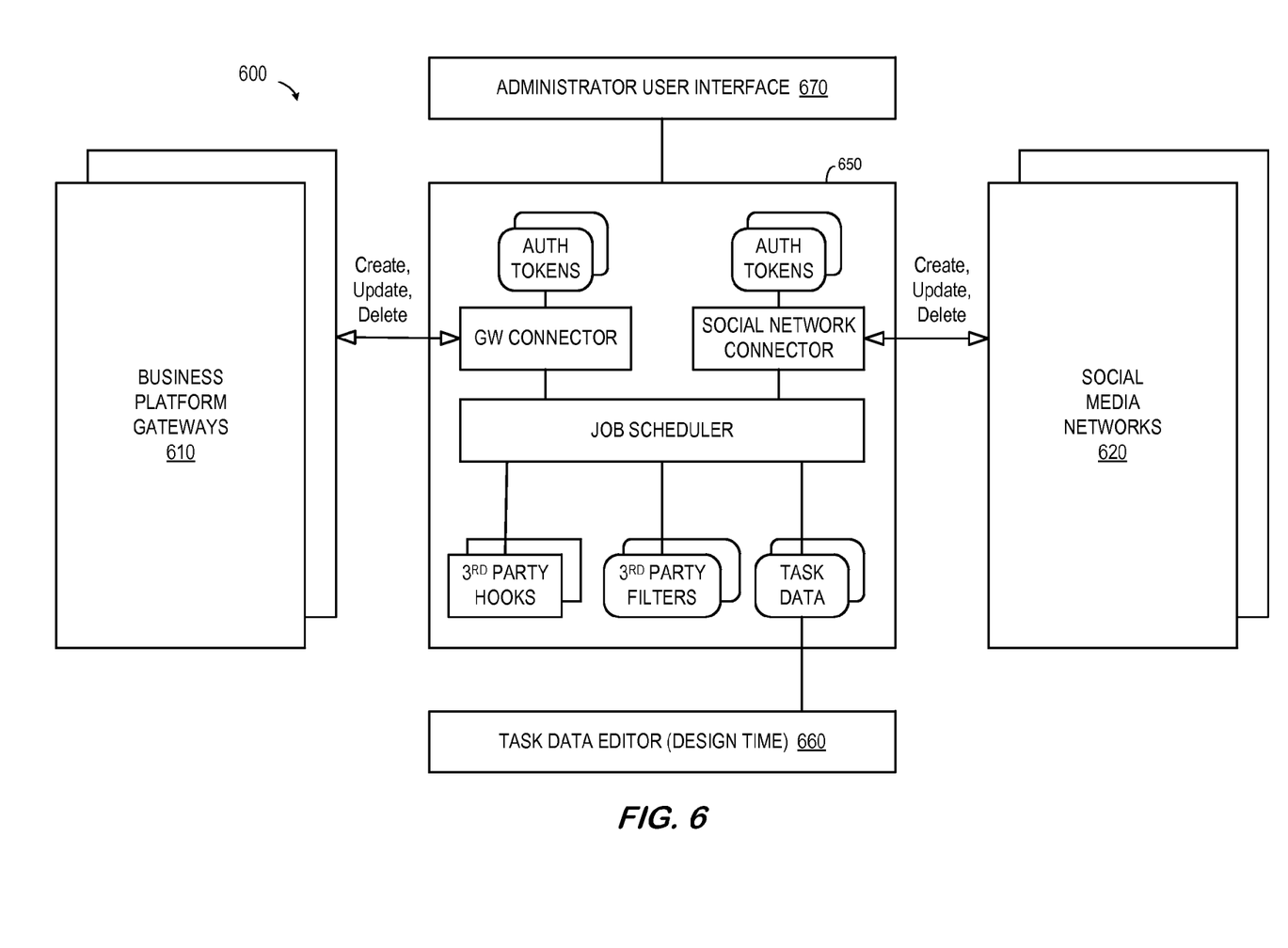
FIG. 6 is a more detailed block diagram of a system suitable for supporting various aspects of the present disclosure.

FIGS. 3 through 5 may be associated with a design time tool that is used to create tasks. FIG. 6 is a more detailed block diagram of a system 600 including elements suitable for supporting execution of those task in accordance with the present disclosure. As with FIG. 1, the system 600 includes one or more business platform gateways 610 that may store and execute business data associated with an enterprise. The system 600 further includes one or more social media networks 620 and a social media network/business platform interface 650 that may facilitate an exchange of information and/or actions between the business platform gateways 610 and social media networks 620 in accordance with any of the embodiments described herein. For exemplary purposes, such social media networks 620 might include ebay.com, Facebook, twitter, LinkedIn, Google +1, etc.

The social media network/business platform interface 650 may include a run time job scheduler component that takes tasks data defined using a task data editor (design time) 660 and executes the task in a configurable time frame (e.g., every 15 minutes). The social media network/business platform interface 650 may also include third party extension points such as points associated with hooks or filters for the tasks. According to some embodiments, a gateway connection within the social media network/business platform interface 650 may access authentication tokens (e.g., an account name and password) to facilitate communication with the business platform gateways 610. Similarly, a social network connector may access authentication tokens to facilitate communication with the social media networks 620. Note that an administrator user interface 660 may provide reporting data to an administrator associated with the performance of the system 600 and/or for configuration of the system 600.

In this way, the system 600 may extend a task, such as by sending an email and creating a complaint within a business platform gateway 610 in response to a comment on the Facebook wall. Moreover, embodiments described herein may facilitate a relatively quick and straightforward way for businesses to define social media integration with respect to existing enterprise systems. Note that a business may want to monitor social media networks 620 and execute business actions based on newly published information. For example, a new negative post or comment published on a Facebook page might trigger creation of new complaint object in an enterprise system. Moreover, embodiments may allow for an update of social media based on events that occur within enterprise systems. For example, a new advertising campaign object created in a Client Relation Management ("CRM") system might automatically create a new post on a company's Facebook page.

The system 600 of FIG. 6 may support an analysis of a substantial amount of social media data and filtering of that data before it is stored within enterprise systems (this may help prevent storing irrelevant data and prevent unnecessary business transaction executions). Moreover, the analysis of social media data may be intelligent and support sentimental analysis to help understand if a social media event is positive or negative. According to some embodiments, the system 600 may detect a major occurrence according to a configurable threshold (e.g., an action might automatically be taken if a product is mentioned 5,000 times on twitter in a single day).

According to some embodiments, the system may supports extensibility points in three major areas: (i) multiple filtering and analytical mechanisms, (ii) implementation of additional social media channels (Google+, LinkedIn, etc.), and (iii) programmatically extending a task by having an Application Programming Interface ("API") for developers to hook into the task process before (or after) an action is executed. Moreover, gateway services created for other needs (e.g., mobile application) or out-of-the-box services can be leveraged in associated with social media. Further, new tasks may be added through the designer in a relatively quick and easy fashion and may be done by a business user with little or no developer knowledge. According to some embodiments, the system 600 may access pre-defined tasks which are common to multiple businesses (using gateway out-of-the-box services). According to some embodiments, the social media entities may not be an exact mirror of the social media API but instead may be "smart" entities hiding business knowledge. For example, a single entity may represent both non-administrative posts on a page and include the author details (thus hiding multiple calls to a Facebook API). Moreover, a gateway push/event mechanism may be used to update social networks based on events that occurred within business platform systems.

Figure 7:
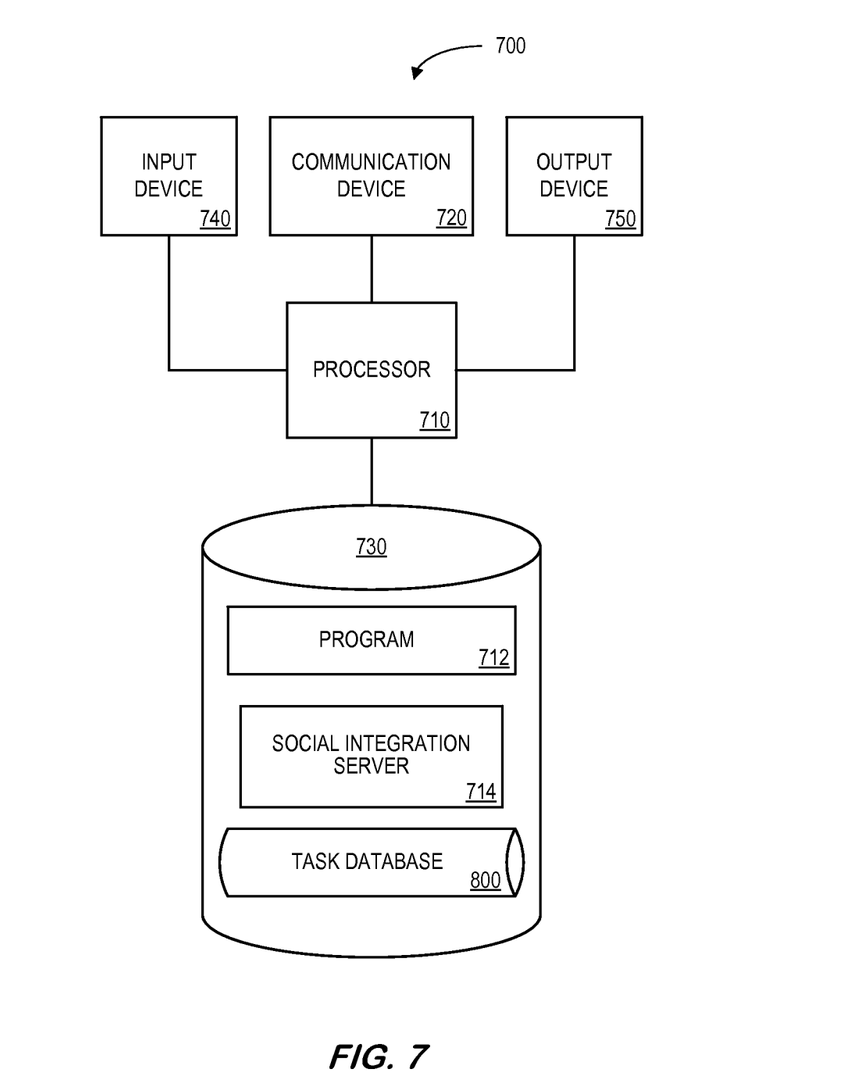
FIG. 7 is a detailed block diagram of a platform according to some embodiments.

The processes described herein may be performed by any suitable device or apparatus. FIG. 7 is one example of a platform 700 according to some embodiments. The platform 700 may be, for example, associated with some or all of the elements described in connection with system 100 of FIG. 1 and system 600 of FIG. 6. The platform 700 comprises a processor 710, such as one or more commercially available Central Processing Units (CPUs) in the form of one-chip microprocessors, coupled to a communication device 720 configured to communicate via a communication network (not shown in FIG. 7). The communication device 720 may be used to communicate, for example, with one or more remote social media networks and/or business platforms. The platform 700 further includes an input device 740 (e.g., a mouse and/or keyboard to enter task triggers, actions and associated parameters) and an output device 750 (e.g., a computer monitor to display reports and/or tables to an administrator).

The processor 710 also communicates with a storage device 730. The storage device 730 may comprise any appropriate information storage device, including combinations of magnetic storage devices (e.g., a hard disk drive), optical storage devices, and/or semiconductor memory devices. The storage device 730 stores a program 712 and/or social integration server 714 for controlling the processor 710. The processor 710 performs instructions of the programs 712, 714, and thereby operates in accordance with any of the embodiments described herein. For example, the processor 710 may receive information associated with a task, including a trigger entity and a related action entity. The processor 710 may then monitor a trigger condition associated with the trigger entity and automatically detect when the trigger condition is satisfied. Moreover, responsive to that detection, the processor 710 may perform an action defined by the action entity related to the trigger entity.

The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices. As used herein, information may be "received" by or "transmitted" to, for example: (i) the platform 700 from another device; or (ii) a software application or module within the platform 700 from another software application, module, or any other source.

Figure 8:
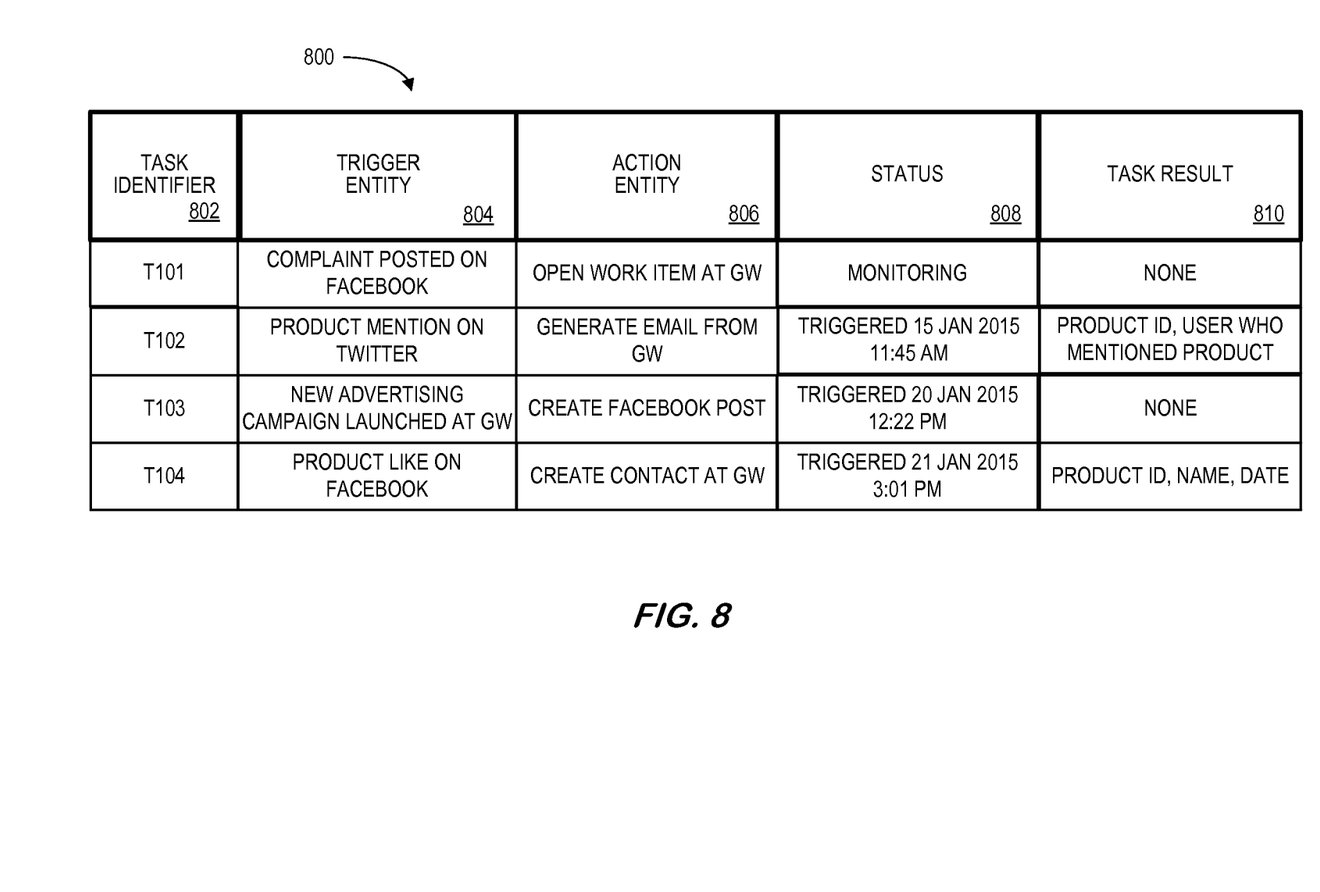
FIG. 8 illustrates a tabular portion of a task database in accordance with some embodiments.

In some embodiments (such as shown in FIG. 7), the storage device 730 stores a task database 800. The task database 800 may, for example, comprise a database that contains task triggers and/or actions associated with social media networks and/or business platforms. Note that the databases mentioned herein are only examples, and additional and/or different information may be stored therein. Moreover, various databases might be split or combined in accordance with any of the embodiments described herein.

FIG. 8 is a tabular portion of task database 800 according to some embodiments. The table may include, for example, entries identifying tasks associated with an interface between social media networks and business platforms. The table may also define fields 802, 804, 806, 808, 810 for each of the entries. The fields 802, 804, 806, 808, 810 may, according to some embodiments, specify: a task identifier 802, a trigger entity 804, an action entity 806, a status 808, and task result 810. The information in the task database 800 may be created and updated, for example, whenever a design defines (or modified) a task at design time or a task is executed at run time.

The task identifier 802 may be, for example, a unique alphanumeric code identifying a task that is to be or has been executed. The trigger entity 804 may be associated with a condition or rule associated with the task identifier 802. For example, the trigger entity 804 might cause the system to monitor Facebook posts for a keyword, social media network "like" or "friend" indications, and/or data stored within a business platform. The action entity 806 might define what action should be automatically performed when the condition of the trigger entity 804 is satisfied. For example, the action entity 806 might be associated with creation of a business object, sending an email, and/or generating a Facebook post. The status 808 may indicate whether the task is currently being monitored and/or whether the task had previously been performed (along with the date and time the task was performed). The task result 810 might record what action as taken and/or what data values resulted from execution of the task. Note that entries in the task database 800 might represent a history log and/or a current state of a system. Moreover, note that a triggered task may occur many times (e.g., the status 808 of task identifier 802 "T101" may transition from "monitoring" to "triggered" and then a list of all trigger dates and time may be stored in the task database 800.

It is not clear whether a monitoring status will eventually become Triggered.

Thus, the task database 800 may facilitate a transfer of unstructured social media data into enterprise systems. Moreover, an intelligent and automatic business transaction may be executed based on a social media event. According to some embodiments, the data in the task database 800 may be defined by a user via a relatively quick and easy definition of tasks that include filtering and/or mapping without the need for complex coding. As a result, a generic solution may be provided for a business customer to help him or her define social media integration according to appropriate needs. The customer may modify and/or add additional tasks as required (instead of developing a specific solution for every scenario that arises).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and user interface configurations have been described herein, not that any number of other configurations may be provided in accordance with embodiments of the present invention (e.g., a social media network/business platform interface and the business platform itself may be remote from each other or co-located). Applicants have discovered that embodiments described herein may be particularly useful in connection with certain types of business information. Note, however, that other types of information may also benefit from the invention.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer-implemented method, the method comprising:
    receiving information associated with a task, the received information including a trigger entity comprising a company or product and a related action entity to perform an action based on a user joining a social media group related to the trigger entity;
    monitoring, at an interface between a social media network and a business platform, a trigger condition associated with the trigger entity wherein the trigger condition is to be triggered based on a social media interaction;
    automatically detecting, at the interface between the social media network and the business platform, that the trigger condition is satisfied; and
    responsive to said detection, using contact information associated with the user for automatically performing an action defined by the action entity related to the trigger entity, the action comprising automatically sending an email or automatically creating a contact entity and the action being performed by the business platform in communication with the social media network via the interface between the social media network and the business platform and a result of the action being stored within the business platform.

2. The method of claim 1, further comprising:
    receiving a negative comment related to the trigger entity, wherein the action entity is to perform a second action based on the negative comment related to the trigger entity; and
    responsive to the received negative comment, using contact information associated with the user for automatically (i) sending an email and (ii) creating a complaint object within the business platform via the interface between the social media network and the business platform.

3. The method of claim 1, wherein the trigger entity is associated with at least one of: (i) a text search, (ii) a keyword, (iii) natural language processing, or (iv) speech to text conversion.

4. The method of claim 2, wherein the action entity is associated with a business platform.

5. The method of claim 4, wherein the action entity is associated with at least one of: (i) sending an email, (ii) creation of a contact entity, (iii) creation of a business object, (iv) an update of an existing entity, or (v) a work item.

6. The method of claim 1, wherein the trigger entity is associated with a business platform.

7. The method of claim 6, wherein the action entity is associated with a social media network.

8. The method of claim 1, wherein the trigger entity and action entity are received from a user via a graphical user interface at design time and said automatic performing of the action is performed at run time.

9. A system, comprising:
    an input port to receive information associated with a task, the received information including a trigger entity comprising a company or product and a related action entity to perform an action based on a user joining a social media group related to the trigger entity; and
    an interface between a social media network and a business platform to: (i) monitor a trigger condition associated with the trigger entity wherein the trigger condition is to be triggered based on a social media interaction, (ii) detect that the trigger condition is satisfied, and to (iii) perform an action defined by the action entity related to the trigger entity responsive to the detection, the action comprising automatically sending an email or automatically creating a contact entity and the action being performed by the business platform in communication with the social media network via the interface between the social media network and the business platform using contact information associated with the user and a result of the action being stored within the business platform.

10. The system of claim 9, further comprising:
    a job scheduler to perform said detection on a user-configurable periodic basis.

11. The system of claim 10, further comprising:
    an interface to access at least one of a third party hook or a third party filter coupled to the job scheduler.

12. The system of claim 9, further comprising:
    a gateway connector adapted to access at least one authentication token and to use said authentication token to exchange information with a business platform gateway.

13. The system of claim 9, further comprising:
    a social media network connector adapted to access at least one authentication token and to use said authentication token to exchange information with a social media network.

14. The system of claim 9, further comprising:
    a design time task data editor graphical user interface to define the trigger entity and the action entity.

15. The system of claim 9, further comprising:
    an administrator user interface to generate reports associated with detections of when the trigger condition was satisfied.

16. A non-transitory, computer-readable medium storing program code executable by a computer processor to perform a method, wherein execution of the code causes the computer processor to:
    receive information associated with a task, the received information including a trigger entity comprising a company or product and a related action entity to perform an action based on a user joining a social media group related to the trigger entity;
    monitor, at an interface between a social media network and a business platform, a trigger condition associated with the trigger entity and wherein the trigger condition is to be triggered based on a social media interaction;
detect, at the social media network/business platform interface, that the trigger condition is satisfied; and
responsive to said detection, use contact information associated with the user to perform an action defined by the action entity related to the trigger entity, the action comprising automatically sending an email or automatically creating a contact entity and the action being performed by the business platform in communication with the social media network via the interface between a social media network and the business platform and a result of the action being stored within the business platform.

17. The medium of claim 16, further comprising:
receiving a negative comment related to the trigger entity, wherein the action entity is to perform a second action based on the negative comment related to the trigger entity; and
responsive to the received negative comment, using contact information associated with the user for automatically (i) sending an email and (ii) creating a complaint object within the business platform via the interface between the social media network and the business platform.

18. The medium of claim 16, wherein the trigger entity is associated with a business platform and the action entity is associated with a social media network.

19. The method of claim 1, further comprising:
detecting the mention of a product based on a configurable threshold of occurrences, and in response to meeting the threshold of occurrences, automatically performing an action by the business platform in communication with the social media network.

20. The method of claim 1, further comprising:
detecting, via the interface between the social media network and the business platform, that a new product is being introduced based on information available within the business platform; and
in response to the detection, arranging, via the interface between the social media network and the business platform, to automatically update a social media network page or post.

* * * * *